(12) United States Patent
Okada et al.

(10) Patent No.: US 6,417,901 B1
(45) Date of Patent: *Jul. 9, 2002

(54) LIQUID CRYSTAL DISPLAY DEVICE IN WHICH LIGHT TRANSMITTING PORTION IS ON THE OPPOSITE SUBSTRATE

(75) Inventors: Yoshihiro Okada, Yamatotakada; Atsushi Ban, Nara; Atsuhito Murai, Kyoto; Takashi Sato, Tenri, all of (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/412,985

(22) Filed: Oct. 6, 1999

(30) Foreign Application Priority Data

Oct. 7, 1998 (JP) .......................... 10-284856
Jul. 30, 1999 (JP) .......................... 11-216105

(51) Int. Cl.[7] ...................... G02F 1/1335; G02F 1/1333
(52) U.S. Cl. ...................... 349/113; 349/106; 349/111
(58) Field of Search .............................. 349/113, 106, 349/111

(56) References Cited

U.S. PATENT DOCUMENTS

| 5,691,791 A | * 11/1997 | Nakamura et al. ........ 349/113 |
| 5,870,157 A | * 2/1999 | Shimada et al. ........... 349/106 |
| 5,877,832 A | * 3/1999 | Shimada ..................... 349/138 |
| 5,910,829 A | * 6/1999 | Shimada et al. ........... 349/110 |
| 5,940,154 A | * 8/1999 | Ukita et al. ................. 349/113 |
| 5,949,507 A | * 9/1999 | Shimada et al. ........... 349/113 |

FOREIGN PATENT DOCUMENTS

| JP | 5-323371 | * 12/1993 |
| JP | 5-323371 A | 12/1993 |
| JP | 8-12353 | * 2/1996 |
| JP | 8-12353 B2 | 2/1996 |
| JP | 9-152593 | * 6/1997 |
| JP | 9-304793 | * 11/1997 |
| JP | 9-325360 | * 12/1997 |
| JP | 10-62768 | * 3/1998 |
| JP | 10-133199 | * 5/1998 |

* cited by examiner

Primary Examiner—William L. Sikes
Assistant Examiner—Mike Qi
(74) Attorney, Agent, or Firm—Nixon & Vanderhye P.C.

(57) ABSTRACT

The invention provides a liquid crystal display device having a structure in which light reflection on lines can be suppressed and reduction in contrast of the liquid crystal display device can be prevented without providing a shielding film on a color filter of an opposite substrate portion. In the liquid crystal display device according to the invention, a shielding film is not provided in a color filter provided on a substrate on the opposite substrate portion side. A signal line is formed of a transparent conductive material such as ITO, amorphous ITO or the like. Consequently, light incident from the surface of the liquid crystal display device passes through the back face of the liquid crystal display device without causing surface reflection even if the light hits upon the signal line in an interval between pixel electrodes. Consequently, it is possible to prevent reduction in contrast caused by the light reflected on the signal line.

28 Claims, 14 Drawing Sheets

▨ AREA OF SIGNAL WIRING

⋮ AREA OF PIXEL ELECTRODE

Prior Art

LIQUID CRYSTAL DISPLAY DEVICE IN WHICH LIGHT TRANSMITTING PORTION IS ON THE OPPOSITE SUBSTRATE

BACKGROUND OF THE INVENTION

1. Field of the Invention

The present invention relates to a liquid crystal display device for use in a direct-view display, a projection display and the like.

2. Description of the Related Art

In recent years, the size and weight of office automation apparatuses such as a personal computer have been reduced, and portable information apparatuses which are usually carried by persons have been put into a practical use. As a display unit for such information apparatuses, a liquid crystal display (LCD) device using liquid crystal has been used most widely because of low power consumption, small size and light weight. As such a liquid crystal display device, a transmission type liquid crystal display device using a back light is usually utilized. In recent years, low power consumption displays have been required and a reflection type liquid crystal display device using no back light has been developed vigorously.

As an example of conventional reflection type liquid crystal display device, a reflection type liquid crystal display device disclosed in Japanese Unexamined Patent Publication JP-A 5-323371 (1993) will be described below.

FIG. 15 is a plan view showing a conventional reflection type liquid crystal display device, and FIG. 16 is a sectional view taken along line A—A of the LCD device shown in FIG. 15. A plurality of scanning lines 102 formed of a material such as aluminum, tantalum or the like are disposed in parallel with each other on an insulating substrate 101 made of glass or the like. A gate electrode 103 branches off from each of the scanning lines 102. A gate insulating film 104 made of nitride silicon ($SiN_x$), silicon oxide ($SiO_2$) or the like is disposed over the whole substrate 101 to cover the gate electrode 103. A semiconductor active layer 105 made of amorphous silicon, polycrystalline silicon or the like is disposed on the gate insulating film 104 provided on the gate electrode 103. A contact electrode 106 made of amorphous silicon to which impurity ions are added, microcrystal silicon, polycrystalline silicon or the like is disposed on both ends of the semiconductor active layer 105. A source electrode 107 and a drain electrode 108 which are made of aluminum, titanium, tantalum, chromium or the like are disposed on the contact electrodes 106 formed on the both ends.

As shown in FIG. 16, a signal line 110 intersecting with the scanning line 102 with the gate insulating film 104 interposed therebetween is connected to the source electrode 107. The signal line 110 is also formed of the same material as the material of the source electrode 7. The gate electrode 103, the gate insulating film 104, the semiconductor active layer 105, the contact electrode 106, the source electrode 107 and the drain electrode 108 constitute a thin film transistor (TFT) 111. The TFT 111 has the function of a switching element.

An interlayer insulating film 112 comprising an inorganic material such as nitride silicon or an organic material is formed over the whole substrate 101 to cover the scanning line 102, the signal line 110 and the TFT 111. A pixel electrode 113 comprising a material having a high reflectivity such as Al is formed on the interlayer insulating film 112. A contact hole 114 is formed in a portion of the interlayer insulating film 112 which overlaps with the drain electrode 108. The pixel electrode 113 and the drain electrode 108 are connected to each other through the contact hole 114. Furthermore, an orientation film (not shown) is formed on the pixel electrode 113. Thus, an active matrix substrate portion is formed.

An opposite substrate portion is disposed to be opposite to the active matrix substrate portion. In the opposite substrate portion, a color filter 116 is formed on an insulating substrate 115 made of glass or the like. One of red, green and blue color layers 116R, 116G and 116B is formed in a region of the color filter 116 corresponding to the pixel electrode 113, and a metallic shielding film (black matrix) 116BM made of chromium nitride, tantalum nitride or the like is disposed in a region opposite to a region between the pixel electrodes 113 or to the signal line 110. The black matrix is formed of black resin and the like other than metals. A common electrode 117 comprising a transparent conductive material such as ITO is formed on the color filter 116. A liquid crystal layer 118 is provided between the active matrix substrate portion and the opposite substrate portion.

Next, the operation of a reflection type liquid crystal display device having such a structure will be described. When the TFT 111 is turned on, a current flows from the signal line 110 to the pixel electrode 113 and the pixel electrode 113 is charged to the voltage of the signal line 110 obtained at that time. At this time, a voltage is applied to the liquid crystal layer 118 interposed between the pixel electrode 113 and the common electrode 117 so that the liquid crystal layer 118 operates. In the reflection type liquid crystal display device, light incident from the opposite substrate portion side is reflected by the pixel electrode 13, thereby performing display. The light incident from the opposite substrate portion side is reflected by the pixel electrode 113 and polarized by the liquid crystal layer 118 so that the transmittances of pixels differ from each other. Consequently, a contrast is formed between two or more pixel electrodes 113 and image display is accomplished.

On the insulating substrate 115 of the opposite substrate portion is formed the color filter 116, in which the black matrix 116 BM is formed in a region of the insulating substrate to be opposite to a region between the pixel electrodes 113 or to the signal line 110. In order to reduce the cost of the color filter, a structure free from the black matrix 116 BM (which will be hereinafter referred to as a BM-less structure) has been examined. This is because there is a problem that the manufacturing cost is greatly increased in the case of use of a metal film for the black matrix. A possible BM-less structure will be described with reference to FIG. 17.

(1) As shown in FIG. 17A, no black matrix is formed in a region of the insulating substrate 115, opposite to a region between the pixel electrodes 113 or to the signal line 110, and the common electrode 117 and the orientation film 151 are directly disposed on the insulating substrate 115.

(2) As shown in FIG. 17B, in the region opposite to the region between the pixel electrodes 113 or to the signal line 110 are overlapped the red color layer 116R and the green color layer 116G, on which the common electrode 117 and the orientation film 151 are laminated.

Alternatively, the red color layer 116R and the green color layer 116G may be disposed to be adjacent leaving no interval therebetween in the region opposite to the region between the pixel electrodes or to the signal line and the scanning line, instead of overlapping the color layers of the color filter. By overlapping the color layers of the color filter or arranging the color layers to be closely adjacent, light can be more shielded than in the examples of FIG. 17A and FIG. 17C, which will be described below.

(3) As shown in FIG. 17C, an insulating film 152 is formed on the color filter 116 to be flat. In that case, the insulating film 152 is embedded in the region opposite to the region between the pixel electrodes 113 or to the signal line 110. The common electrode 117 and the orientation film 151 are provided on the insulating film 152.

With the structures shown in FIGS. 17A to 17C, shielding properties are more deteriorated than in the structure having the black matrix. Therefore, light transmission occurs in the region opposite to the region between the pixel electrodes 113 or to the signal line 110. In the case where the prior art reflection type liquid crystal display device has the BM-less structure as shown in FIG. 18, light 121 incident from the surface of the reflection type liquid crystal display device hits upon the signal line 110 of an interval 119 between the pixel electrodes 113 (which is equivalent to the black matrix 116 BM), thereby causing surface reflection because a metal having a high reflectivity such as aluminum, titanium or the like is used for a line material. This phenomenon causes the following drawbacks. Since a fluctuating voltage is always applied to the signal line 110, a voltage corresponding to a voltage applied to a liquid crystal of a region of the LCD device where gradation display is performed is always applied to the liquid crystal layer 118 provided above the signal line 110. For this reason, the liquid crystal layer 118 provided above the signal line 110 has light transmitting properties corresponding to the voltage. Accordingly, in the case where the incident light is reflected by the signal line 110 and black display is performed in the pixel electrode 113, the contrast decreases due to the reflected light.

Moreover, a voltage which is equal to or higher than a threshold voltage of the liquid crystal is applied onto the scanning line 102. The liquid crystal layer 118 provided on the scanning line 102 has a transmittance of 100% when the liquid crystal is set in a normally black mode. Therefore, the same problem arises.

Japanese Examined Patent Publication JP-B-2 8-12353 (1996) discloses a liquid crystal display device in which a gate line, that is, a scanning line is formed of a conductive material for shielding light, and a shielding film comprising a material identical to the material of the gate line is formed along a source line, that is, a signal line apart from the source line. Also in the liquid crystal display device having such a structure, a shielding film should be provided in a region of a color filter which is opposite to the line in order to increase the effect of shielding light.

SUMMARY OF THE INVENTION

It is an object of the invention to provide a liquid crystal display device having a structure in which light reflection of a line can be suppressed and a decrease in contrast can be prevented without providing a shielding film in an opposite substrate portion.

The invention provides a liquid crystal display device comprising a liquid crystal layer, an active matrix substrate portion and an opposite substrate portion which is provided opposite to the active matrix substrate with the liquid crystal layer interposed therebetween, the active matrix substrate portion having:
a first insulating substrate;
a plurality of scanning lines provided on the first insulating substrate;
a plurality of signal lines provided to intersect with the scanning lines through an insulating film;
a plurality of switching elements provided in the vicinity of the intersecting portions of the scanning lines with the signal lines; and
a plurality of pixel electrodes connected to the switching elements, respectively,
the signal lines being provided in a region between the pixel electrodes on the first substrate, and
the opposite substrate portion having:
a second insulating substrate;
a color filter provided on the second substrate; and
a common electrode provided on the second substrate, comprising a transparent conductive material,
wherein color layers of the color filter are formed in a region opposite to the pixel electrode, and a light transmitting portion is provided in a region opposite to at least a part of the region between the pixel electrodes, and
number of components of light which can be transmitted through a light transmitting portion is large than that of light which can be transmitted through the color layers, and the signal lines are formed of a transparent conductive material.

According to the liquid crystal display device of the invention, the light incident from the opposite substrate portion side of the liquid crystal display device is reduced to be reflected by the signal lines and is transmitted through the insulating film and the substrate of the active matrix substrate portion to the back face of the liquid crystal display device. Therefore, when black display is performed, surface reflection is reduced. Consequently, a black level can be improved and a contrast can be enhanced.

In the invention it is preferable that the pixel electrode has a reflecting function.

According to the invention, also in the case of a reflection type liquid crystal display device in which the pixel electrode has the reflecting function, the light incident from the opposite substrate portion side of the reflection type liquid crystal display device is reduced to be reflected by the signal lines and is transmitted through the insulating film and the substrate of the active matrix substrate portion to the back face of the liquid crystal display device. Therefore, when black display is performed, surface reflection is reduced. Consequently, a black level can be improved and a contrast can be enhanced. Thus, in the case where at least a portion of the pixel electrode has the reflecting function, the above-mentioned effects can be particularly produced remarkably by the structure in which the signal lines transmit light.

In the invention it is preferable that reflectivity R of the signal line and ratio (AS/AD) of area AS of the signal line to area AD of the pixel electrode ranges within a region enclosed by a straight line A defined by expressions (1), (2), a straight line B defined by expressions (3), (4) and a curve C defined by an expression (5).

$$R \geq R\text{min} \tag{1}$$

$$R\text{min}\left(\left(\frac{n1-n2}{n1+n2}\right)^2 + \left(1-\left(\frac{n1-n2}{n1+n2}\right)^2\right)\times\left(\frac{n2-n3}{n2+n3}\right)^2\right)\times 100 \tag{2}$$

n1: refractive index of an upper layer portion which is in contact with the signal line
n2: refractive index of the signal line n3: refractive index of a lower layer portion which is in contact with the signal lines $$(AS/AD) \geq B\min \quad (3)$$

$$B\min = \frac{(f \times h1)}{(f - h2 - 2i) \times (g - h1 - 2i)} \quad (4)$$

f: longitudinal length of one pixel
g: transverse length of one pixel
h1: signal line width
h2: scanning line width
i: sampling width $$(AS/AD) \geq (YW - 15YB)/(14YM \times R) \quad (5)$$

YW: brightness obtained in white display state
YB: brightness obtained in black display state
VW: voltage to be applied in white display state
VB: voltage to be applied in black display state
YM: brightness obtained with an applied voltage of (VW+VB)/2

According to the invention, moreover, the area of the pixel electrode, the area of the signal line and the reflectivity on the surface of the signal line are optimized. Consequently, a contrast can be enhanced in a liquid crystal display device having any specification.

In the invention it is preferable that a material having a high light absorption is disposed on the back face of the liquid crystal display device.

According to the invention, the light incident from the opposite substrate portion side of the liquid crystal display device is not reflected by the signal lines but is transmitted through the insulating film and the substrate of the active matrix substrate portion to the back face of the liquid crystal display device and strikes upon the material having a high light absorption. Therefore, the light is not reflected again toward the liquid crystal layer side. Consequently, light approach to the switching element can be prevented, thereby maintaining an excellent black level.

In the invention it is preferable that the light transmitting portion is provided in the region opposite to the signal line in the opposite substrate portion.

According to the invention, in the liquid crystal display device, also in the case where a light emitting portion is provided in a region opposite to the signal line, the signal line is formed of a transparent conductive material. Therefore, light reflection on the surface of the signal line is not caused when any pixel of the liquid crystal display device performs black display. Consequently, a black level can fully be improved and a contrast can be enhanced.

In the invention it is preferable that the orientation state of a liquid crystal molecule in the liquid crystal layer is set such that the liquid crystal display device becomes normally white.

According to the invention, also in the case where the liquid crystal display device has a structure in which a color filter having a BM-less structure is formed in an opposite substrate portion, a liquid crystal in a normally while mode is used and a signal line is formed of a transparent conductive material, it is possible to prevent a contrast from being deteriorated by light reflection in the signal line.

In the invention it is preferable that the scanning lines are provided in regions between the pixel electrodes in the active matrix substrate portion, the light transmitting portion is provided in regions opposite to the signal line and the scanning line in the opposite substrate portion, and the scanning line is formed of the transparent conductive material.

According to the invention, in the case where the light transmitting portion is provided in the regions opposite to both the signal line and the scanning line in the liquid crystal display device, not only the signal line but also the scanning line is formed of a transparent conductive material. Therefore, when any of pixels of the liquid crystal display device performs black display, the light reflection is not caused on the surfaces of the signal line and the scanning line. Consequently, the black level can further be improved and the contrast can be enhanced still more.

In the invention it is preferable that the orientation state of the liquid crystal molecule in the liquid crystal is set such that the liquid crystal display device becomes normally black.

According to the invention, also in the case where the liquid crystal display device has a structure in which a color filter having a BM-less structure is formed on an opposite substrate, a liquid crystal in a normally black mode is used and a signal line and a scanning line are formed of a transparent conductive material, it is possible to prevent a contrast from being deteriorated by light reflection with the signal line and the scanning line.

The invention provides a liquid crystal display device comprising:

first and second insulating substrates;

a liquid crystal layer between the first and second substrates;

a plurality of pixel electrodes mutually provided on the first substrate at regular intervals;

a plurality of lines provided between the pixel electrodes;

a common electrode provided on the second substrate and opposed to two or more pixel electrodes; and a color filter provided on the second substrate, wherein the color filter includes color layers provided in regions opposite to the pixel electrodes and a light transmitting portion provided in regions between the color layers, more components of light can be transmitted through the light transmitting portion than components of light which can be transmitted through the color layers, and the line is formed of a transparent electrode material.

According to the invention, the liquid crystal display device comprises a color filter having a BM-less structure and lines disposed between pixel electrodes, comprising a transparent conductive material. For example, in the case where the liquid crystal display device has a 3-terminal element, at least one of a signal line and a scanning line are connected to the 3-terminal element. In the case where the liquid crystal display device has a 2-terminal element, the line is connected to the 2-terminal element. In the case where the liquid crystal display device has an additional capacitance, the line is connected to the additional capacitance. Thus, in the case where the line between the pixel electrodes has light transmitting properties, the light reflection is reduced on the surface of the line. Therefore, the black level of the liquid crystal display device can be improved and a contrast can be enhanced.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
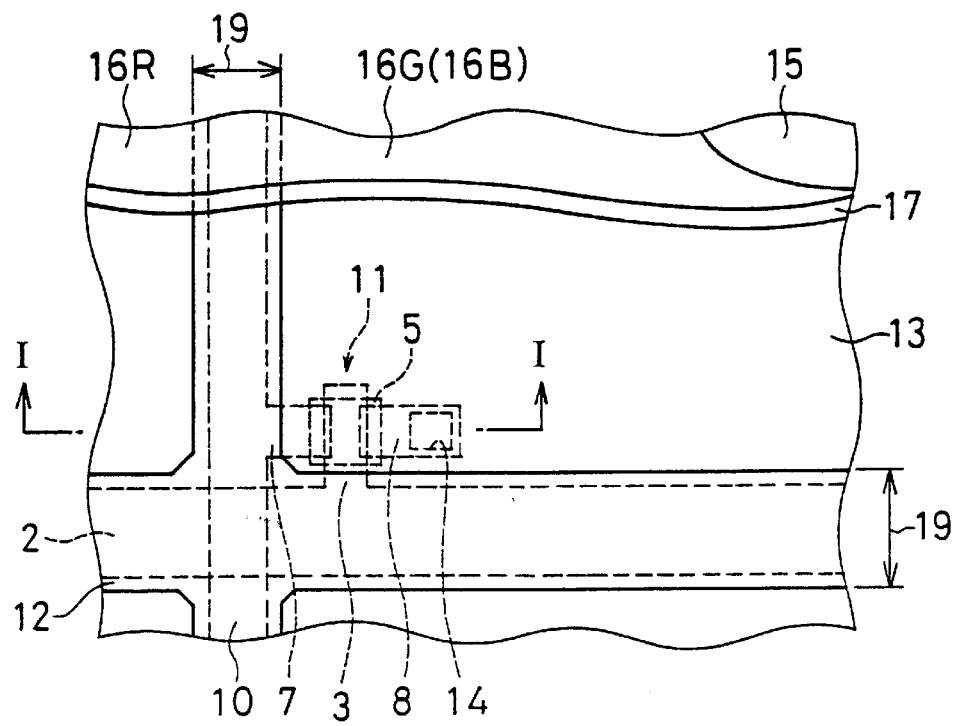
FIG. 1 is a partially enlarged plan view showing a liquid crystal display device according to a first embodiment.

Now referring to the drawings, preferred embodiments of the invention are described below.

Figure 2:
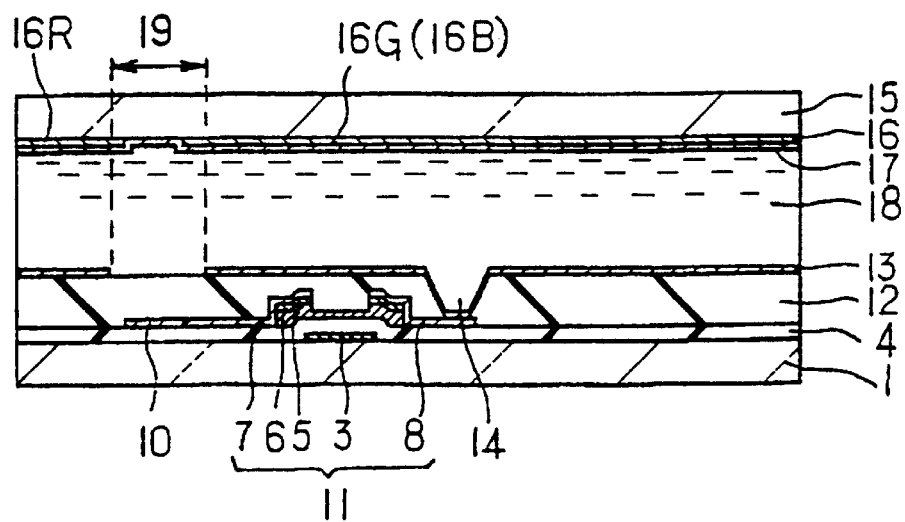
FIG. 2 is a partially enlarged sectional view showing the liquid crystal display device according to the first embodiment.

FIG. 1 is a plan view showing a liquid crystal display (LCD) device according to a first embodiment, and FIG. 2 is a sectional view taken along line B—B of the LCD device shown in FIG. 1. The liquid crystal display device shown in FIGS. 1 and 2 is a reflection type liquid crystal display device of an active matrix type using a 3-terminal element as a switching element and is set in a normally white mode. The liquid crystal display device comprises a liquid crystal layer, an active matrix substrate portion and an opposite substrate portion. The active matrix substrate portion is opposed to the opposite substrate portion with the liquid crystal layer interposed therebetween.

In the active matrix substrate portion, a plurality of scanning lines 2 made of aluminum, tantalum or the like are provided in parallel with each other on a first insulating substrate 1 made of glass or the like, and a gate electrode 3 branches off from each of the scanning lines 2. A gate insulating film 4 made of silicon nitride ($SiN_x$), silicon oxide ($SiO_2$) or the like is formed over the whole substrate 1 with the gate electrode 3 covered. A semiconductor active layer 5 made of amorphous silicon, polycrystalline silicon, SiGe or the like is formed on the gate insulating film 4 provided on the gate. electrode 3. A contact electrode 6 made of amorphous silicon to which impurity ions are added, microcrystal silicon, polycrystalline silicon or the like is formed on both ends of the semiconductor active layer 5. A source electrode 7 comprising a transparent conductive material such as ITO, amorphous ITO or the like is formed on one of the contact electrodes 6, and a drain electrode 8 comprising a transparent conductive material such as ITO, amorphous ITO or the like is superposed on the other contact electrode 6 in the same manner as the source electrode 7.

As shown in FIG. 2, a signal line 107 intersecting with the scanning line 2 with the gate insulating film 4 interposed therebetween is connected to the source electrode 7. A signal line 10 is also formed of the same transparent conductive material as the material of the source electrode 7. The gate electrode 3, the gate insulating film 4, the semiconductor active layer 5, the contact electrode 6, the source electrode 7 and the drain electrode 8 constitute a TFT 11, and the TFT 11 has the function of a switching element.

An interlayer insulating film 12 comprising an inorganic material such as silicon nitride or an organic material is formed over the whole substrate 1 with the scanning line 2, the signal line 10 and the TFT 11 covered. A pixel electrode 13 comprising a material having a high reflectivity such as Al is formed on the interlayer insulating film 12. A contact hole 14 is formed in a portion on the drain electrode 8 of the interlayer insulating film 12. The pixel electrode 13 and the drain electrode 8 are connected to each other through a contact hole 14. Furthermore, an orientation film (not shown) is formed on the pixel electrode 13. Thus, an active matrix substrate portion is formed.

In order to enhance a numerical aperture of a pixel, the interlayer insulating film 12 is formed thickly. Depending on specification or purpose, the interlayer insulating film 12 does not need to be formed thickly. When scattering characteristics are required, a concavo-convex shape may be provided on the pixel electrode 13 side of the interlayer insulating film 12.

In the opposite substrate portion, a color filter 16 is formed on a second insulating substrate 15 made of glass or the like. Any of red, green and blue color layers 16R, 16G and 16B is formed in a region opposite to each the pixel electrodes 13 in the color filter 16, and a shielding film is not provided in a region opposite to a region between the pixel electrodes 13 or a region opposite to the signal line 10. A common electrode 17 comprising a transparent conductive material such as ITO is formed on the color filter 16. As shown in FIGS. 1 and 2, the color filter 16 has a BM-less structure, and the common electrode 17 is formed in a region on the second substrate 15 opposite to the region between the pixel electrodes 13 or a region on the second substrate 15 opposite to the signal line 10.

A liquid crystal is injected into a space between the active matrix substrate portion and the opposite substrate portion. A liquid crystal layer 18 made of the injected liquid crystal is orientated in parallel to be brought into a normally white mode. Furthermore, a phase contrast plate and a scattering plate (not shown) is provided on the opposite side of the liquid crystal layer of the second substrate 15. Since the pixel electrode 13 is flat, the scattering plate is provided, in order to diffuse the reflected light. Therefore, in the case where the pixel electrode 13 has a concavo-convex structure, the scattering plate does not need to be provided separately.

Next, a method for manufacturing the liquid crystal display device according to the first embodiment will be described. Tantalum having a thickness of 100 nm to 5000 nm is deposited on the first substrate 1 on the active matrix substrate portion side by sputtering. The scanning line 2 and the gate electrode 3 are formed from the deposited tantalum by photolithography and RIE (Reactive Ion Etching). Subsequently, a $SiN_x$ film to be the gate insulating film 4, an amorphous silicon film to be the semiconductor active layer 5, and an n$^+$added microcrystal silicon film (which will be hereinafter referred to as an n$^+$film) to be the contact layer 6 are sequentially provided by a plasma CVD method. The $SiN_x$ film has a thickness of 300 nm, the amorphous silicon film has a thickness of 200 nm and the n$^+$film has a thickness of 50 nm. By using the photolithography and the RIE, the amorphous silicon film and the n$^+$film are formed like an island.

Next, an ITO film having a thickness of 100 nm to 300 nm is deposited by the sputtering. The ITO film has a resistivity of 150 $\mu\Omega$·cm to 400 $\mu$·cm.

An aluminum alloy (having a resistivity of 10 $\mu\Omega$·cm and a thickness of 200 nm) is used for the scanning line. In the case where the ITO film has a thickness of 200 nm and a resistivity of 200 $\mu\Omega$·cm, a 10.4 type VGA glass can be designed. In this case, the signal line has such a structure that a signal is input from upper and lower sides.

By applying photolithography and wet etching to the ITO film, the signal line 10, the source electrode 7 and the drain electrode 8 are formed from the ITO film. By using the processed ITO film as a mask, apart of the n$^+$film and the amorphous silicon film are then subjected to dry etching using a mixed gas of HCl/SF$_6$. As a result, the TFT 11 is finished.

Subsequently, the interlayer insulating film 12, which comprises an organic material and has a thickness of 1 $\mu$m to 3 $\mu$m, is deposited, and the contact hole 14 is formed on the interlayer insulating film 12 by using the photolithographic process. A film of Al/Mo to be the pixel electrode 13 is deposited by the sputtering. A film of Al and a film of Mo constitute the film of Al/Mo, the film of Mo is provided under the film of Al, thereby preventing electrolytic corrosion of Al and ITO. Furthermore, an orientation film made of polyimide is applied. As a result, the active matrix substrate portion is finished.

After the color filter 16 is formed on the second substrate 15 made of glass on the opposite substrate portion side, the ITO is deposited by the sputtering. As a result, the opposite substrate portion is finished. The active matrix substrate portion and the opposite substrate portion are stuck together with a gap, and a liquid crystal is injected therebetween. Consequently, a liquid crystal display device can be obtained. The operation of the liquid crystal display device having such a structure is the same as the operation of a conventional liquid crystal display device.

As described above, according to the first embodiment, the signal line 10 is formed of a transparent conductive material such as ITO, amorphous ITO or the like. Consequently, light incident from the surface of the liquid crystal display device is not reflected by the signal line 10 but most of the incident light passes through the back face of the liquid crystal display device. Therefore, it is possible to prevent a contrast from being deteriorated by the reflected light on the signal line 10.

While the signal line 10 has been formed of the transparent conductive material such as ITO, amorphous ITO or the like, it may be formed of a conductive material having a small surface reflectivity and such a characteristic that the light incident on the signal line passes through the back face of the liquid crystal display device.

Figure 3:
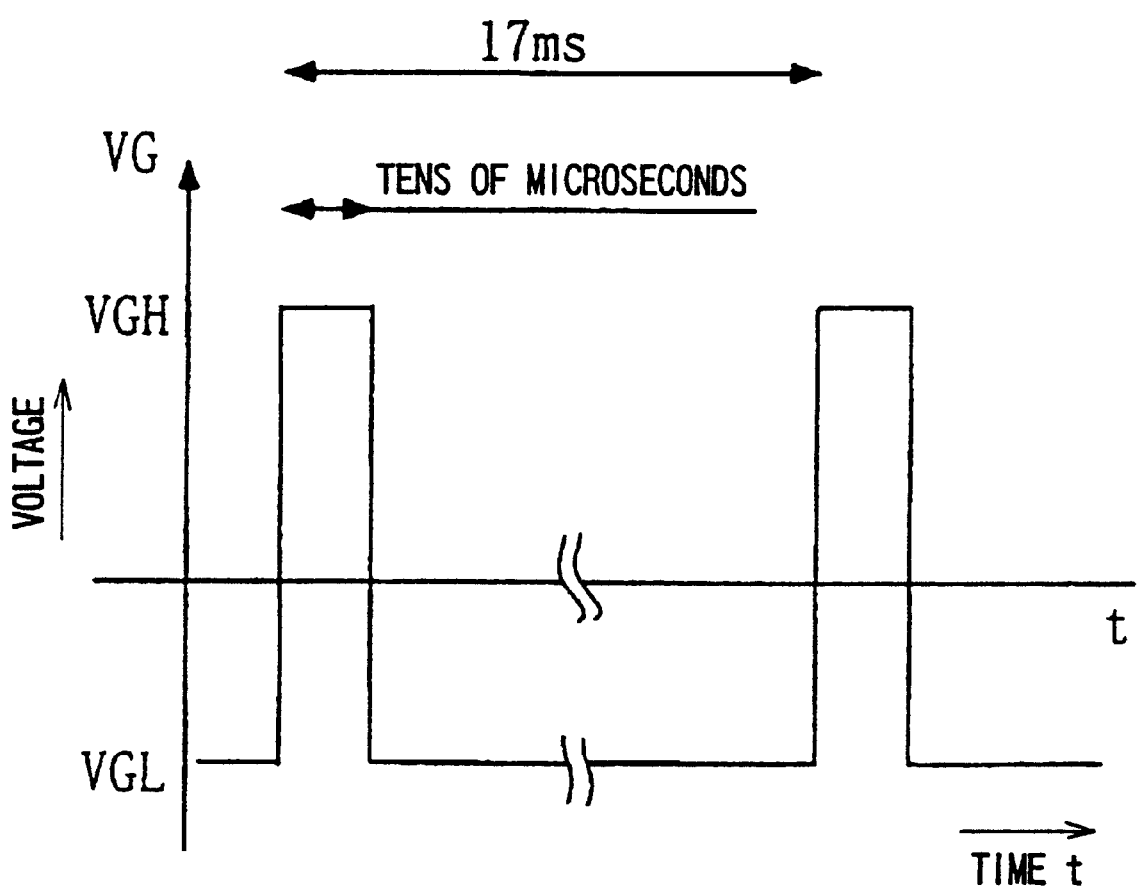
FIG. 3 is a waveform diagram showing a signal sent to a scanning line 2 of a LCD device in FIG. 1.
Figure 18:
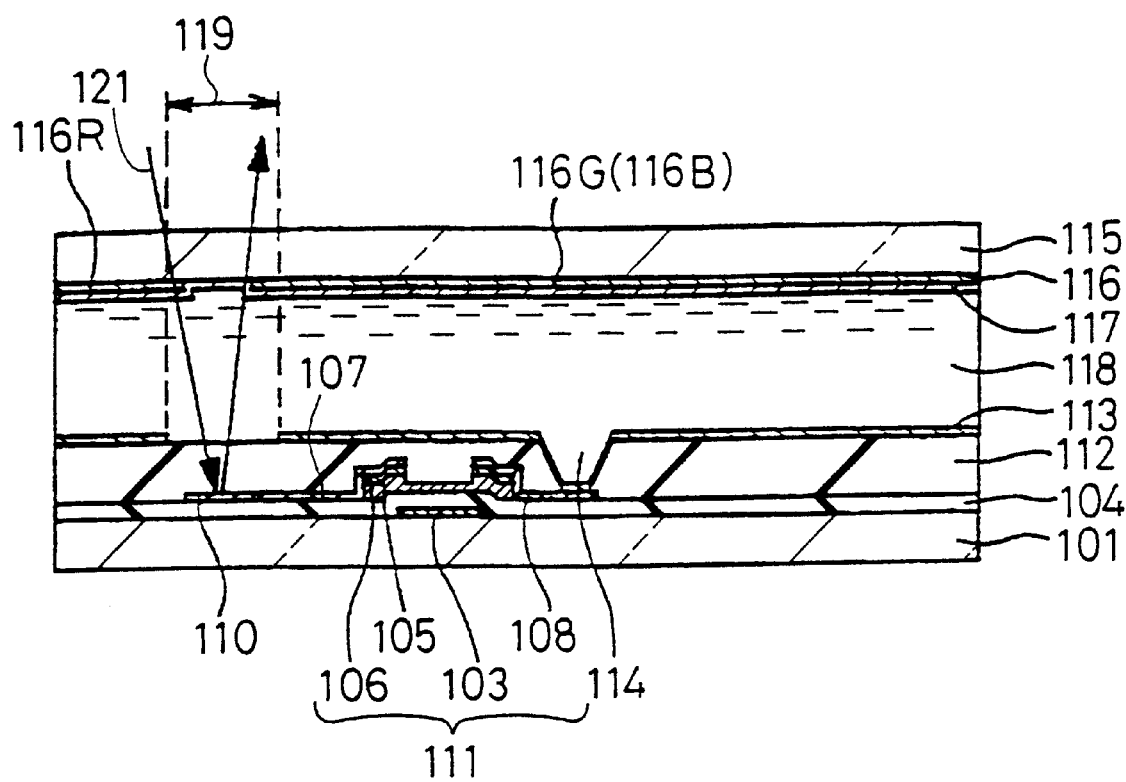
FIG. 18 is a partially enlarged sectional view showing the reflection type liquid crystal display device according to the prior art having the BM-less structure.

A signal shown in FIG. 3 is input to the signal line 2. Within one frame of 17 ms, VG=VGH (about +15V) is set only for several tens $\mu$s and VG=VGL (about −10V) is set for other periods. Accordingly, a voltage of about 10 V is applied all the time between the scanning line 2 and the common electrode 17. For this reason, a normally white liquid crystal is changed into black display. Also in the case where the incident light shown in FIG. 18 is on the scanning line 2, the liquid crystal on the scanning line 2 has the black display. Therefore, the display is not affected. Accordingly, the scanning line 2 may be formed of a transparent conductive material or a metal material.

Figure 4:
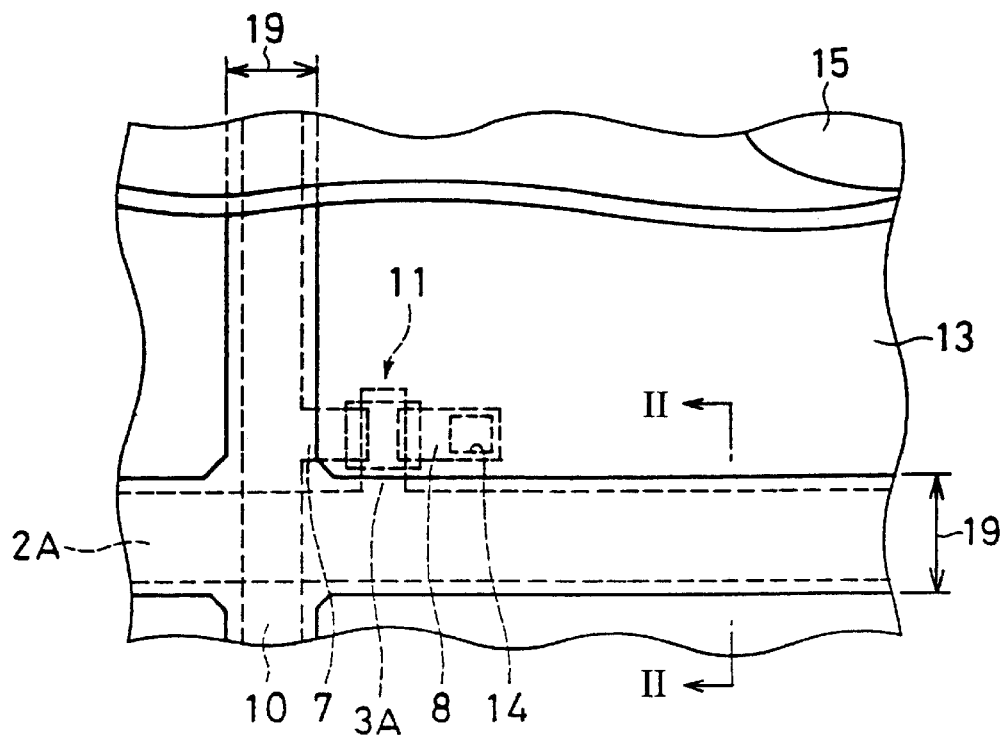
FIG. 4 is a partially enlarged plan view showing a liquid crystal display device according to a second embodiment.
Figure 5:
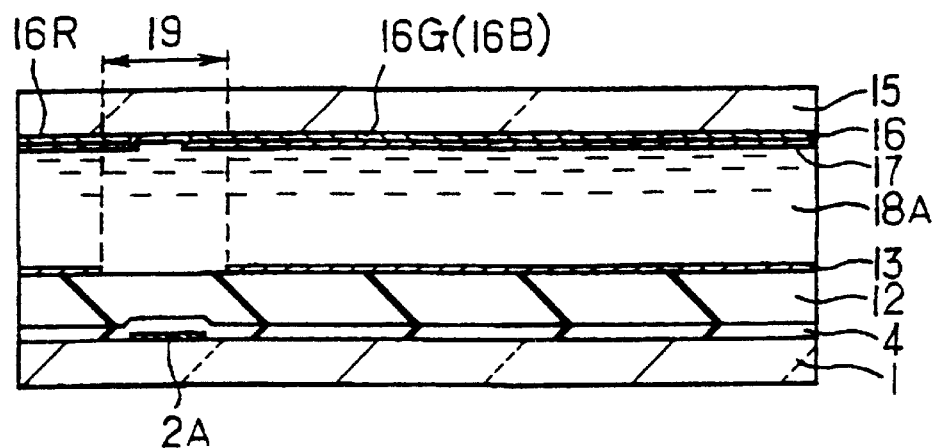
FIG. 5 is a partially enlarged sectional view showing the liquid crystal display device according to the second embodiment.

FIG. 4 is a plan view showing a liquid crystal display device according to a second embodiment, and FIG. 5 is a sectional view taken along the line C—C of the LCD device shown in FIG. 4. A sectional view taken along the line B—B showing a signal line including a TFT 11 is the same as in FIG. 2. The liquid crystal display device shown in FIGS. 4 and 5 is a reflection type liquid crystal display device of an active matrix type using a 3-terminal element as a switching element and is set in a normally black mode. In the following description, the same parts having the same effects as the effects of the parts of the liquid crystal display device according to the first embodiment have the same reference numerals, and their description will be omitted.

The liquid crystal display device comprises a liquid crystal layer, an active matrix substrate portion and an opposite substrate portion. The active matrix substrate portion is opposed to the opposite substrate portion with the liquid crystal layer interposed therebetween. The structure of the active matrix substrate portion according to the second embodiment other than the materials of the scanning line 2A and the gate electrode 3A is equal to that of the active matrix substrate portion according to the first embodiment. The structure of the opposite substrate portion according to the second embodiment is equal to that of the opposite substrate portion according to the first embodiment.

In the active matrix substrate portion, a plurality of scanning lines 2A made of ITO are provided in parallel with each other on an insulating substrate 1 made of glass or the like, and a gate electrode 3A branches off from each of the scanning lines 2A. The scanning line 2A and the gate electrode 3A are formed of a transparent conductive material. A gate insulating film 4 made of silicon nitride ($SiN_x$), silicon oxide ($SiO_2$) or the like is formed over the whole substrate 1 with the gate electrode 3A covered. A semiconductor active layer 5 made of amorphous silicon, polycrystalline silicon, SiGe or the like is formed on the gate insulating film 4 provided on the gate electrode 3A.

The active matrix substrate portion and the opposite substrate portion are stuck together and a liquid crystal is injected into a space therebetween. A liquid crystal layer 18A made of the injected liquid crystal is vertically orientated to be brought into a normally black mode. Furthermore, a phase contrast plate and a scattering plate (not shown) is provided on the opposite side of the liquid crystal layer of the second substrate 15. Since the pixel electrode 13 is flat, the scattering plate is provided, in order to diffuse the reflected light. Therefore, in the case where the pixel electrode 13 has a concavo-convex structure, the scattering plate does not need to be provided separately. Thus, a liquid crystal display device can be obtained. The operation of the liquid crystal display device having such a structure is the same as that of a conventional liquid crystal display device.

As described above, according to the second embodiment, the signal line 10 and the scanning line 2A are formed of a transparent conductive material such as ITO, amorphous ITO or the like. Consequently, light incident from the surface of the liquid crystal display device is not reflected by the signal line 10 and the scanning line 2A but most of the incident light passes through the back face of the liquid crystal display device. Therefore, it is possible to prevent a contrast from being deteriorated by the reflected light on the signal line 10 and the scanning line 2A.

While the signal line 10 and the scanning line 2A have been formed of the transparent conductive material such as ITO, amorphous ITO or the like, it may be formed of a conductive material having a small surface reflectivity and such a characteristic that the light incident on the signal line passes through the back face of the liquid crystal display device.

Figure 6:
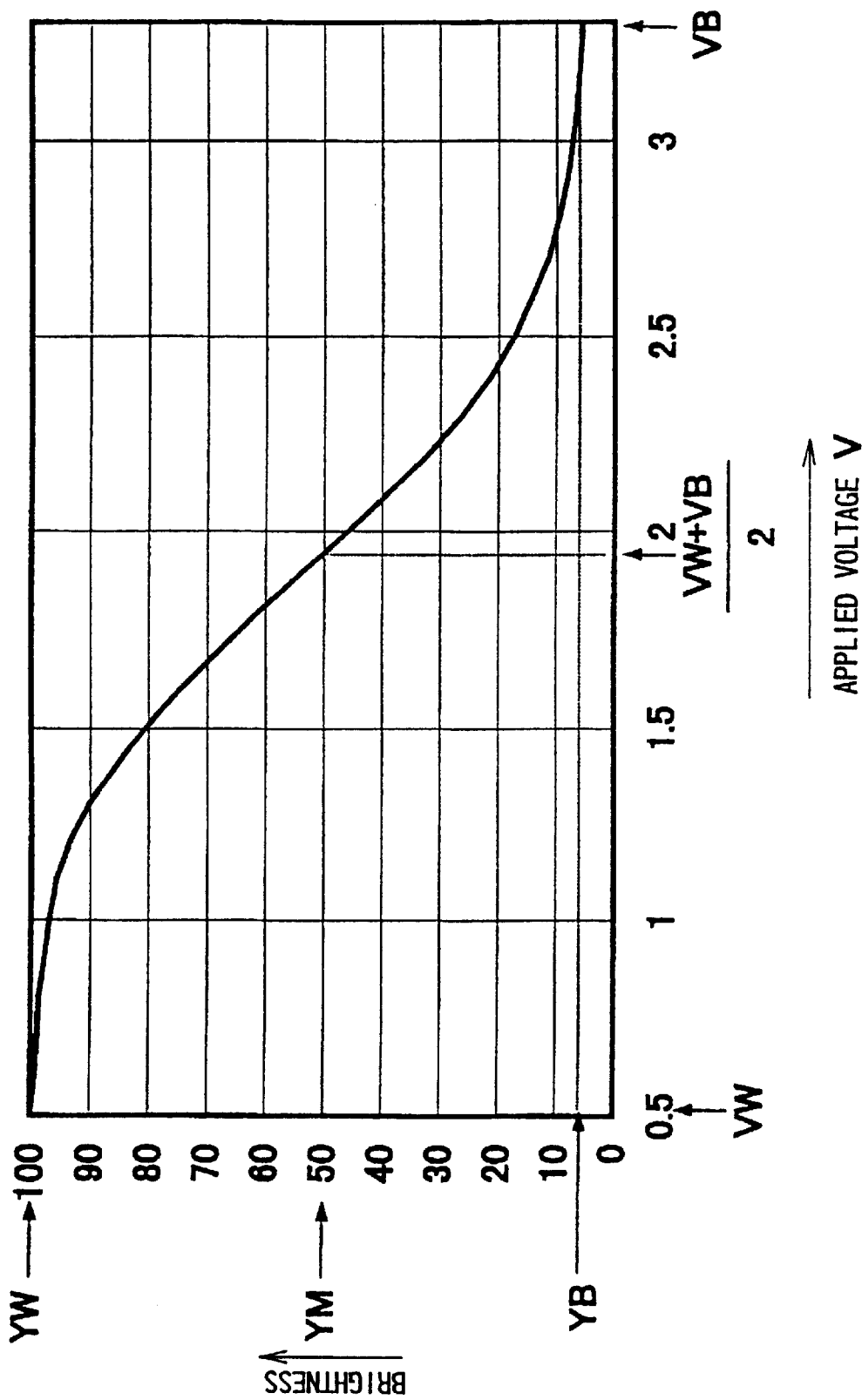
FIG. 6 is a chart showing a relationship between applied voltage and brightness of pixels of the LCD device.

Next, the optimum range of the signal line in the LCD device according to the first embodiment will be described. FIG. 6 shows electro-optical characteristics of the liquid crystal layer used in the first embodiment (characteristics of applied voltage and brightness). An axis of ordinate denotes a relative brightness obtained by setting a brightness of 100% when an applied voltage is OFF. In a white display state, an applied voltage VW is 0.5 V and a brightness YW is 100%. In an black display state, an applied voltage VB is 3.3 V and a brightness YB is 5%.

Figure 7:
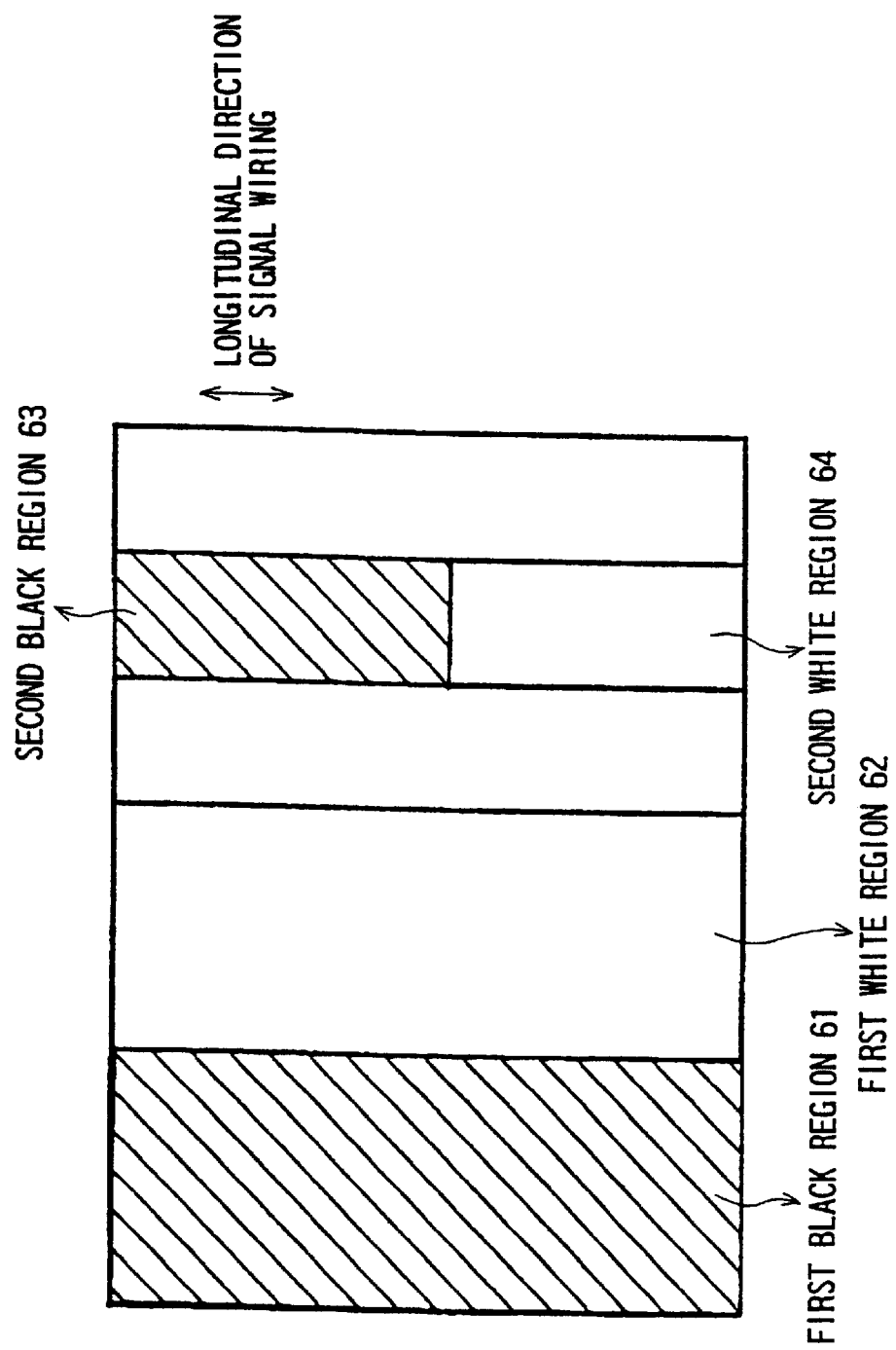
FIG. 7 is a diagram showing an example of a white and black pattern experimentally displayed on the LCD device.

By the liquid crystal display device manufactured in the first embodiment, a white and black pattern shown in FIG. 7 is displayed. As shown in first black and first white regions 61 and 62, in the case where the same display is performed in two or more pixels connected to one signal line, the same voltage is applied to a liquid crystal on the pixel electrode and a liquid crystal on the signal line. Therefore, a contrast CR of the LCD device which considers both a potion on the pixel electrode in a LCD device display screen and a portion on the signal line in the LCD device display screen is simply obtained by YW/YB, resulting in a value of 20.

However, in the case where the display is mutually varied by two or more pixel electrodes connected to one signal line as in second black and white regions 63 and 64, the following contrast CR of the LCD device is obtained.

A brightness in the portion on the pixel electrode is YW or YB. A voltage (which is set to (VW+VB)/2) corresponding to a voltage applied to a liquid crystal in a region of the LCD device where gradation display is performed always flows to the signal line. Therefore, a brightness in the portion on the signal line is YM. The contrast CR of the LCD device is calculated by the following equation:

$$CR=(YW\times\text{area of pixel electrode}+YM\times\text{area of signal line}\times R)/(YB\times\text{area of pixel electrode}+YM\times\text{area of signal line}\times R),$$

wherein the reflectivity of the signal line is represented by R. The reflectivity R of the signal line is a ratio representing a degree of light reflected by the surface of the signal line when the whole light incident on the signal line is 100. In other words, the contrast CR is changed depending on the area of the signal line, the area of the pixel electrode and the reflectivity of the signal line.

Figure 8:
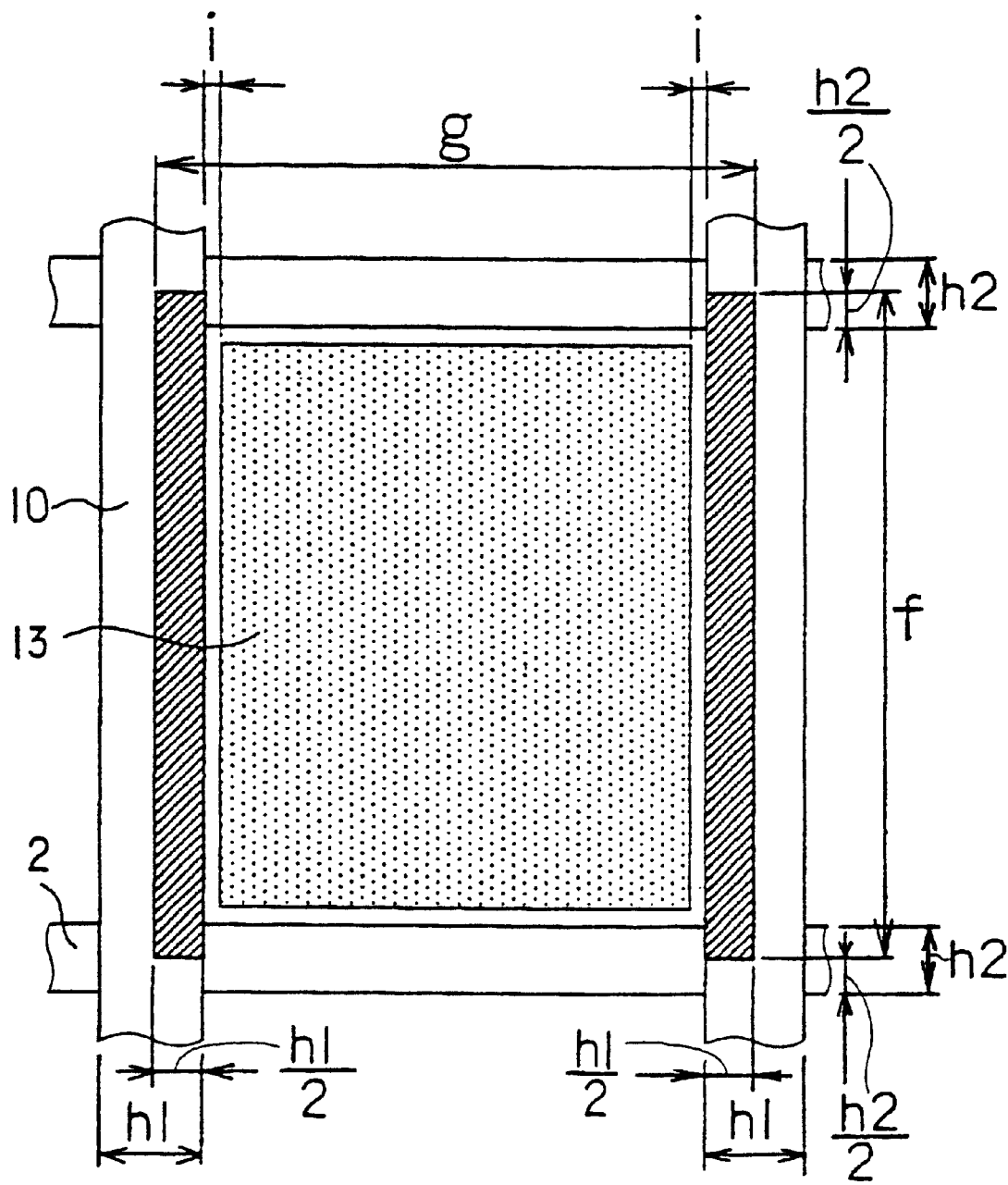
FIG. 8 is a diagram typically showing the shapes of a pixel electrode, a signal line and the like in the LCD device.

In order to check the above-mentioned relationship, a positional relationship among the pixel electrode 13, the signal line 10 and the like is typically shown in FIG. 8. A vertical length f (in the longitudinal direction of the signal line 10) of one pixel is set between the centers of two signal lines 10 which are adjacent to each other. A transverse length g (in the longitudinal direction of the scanning line 2) of one pixel is set between the centers of two scanning lines 2 which are adjacent to each other. The shape of the pixel electrode 13 is almost rectangular. One pixel represents a unit structure comprising the signal line 10, the scanning line 2 and the pixel electrode 13. The area of one pixel is represented by f×g. In FIG. 8, a region shown in a right upward hatching denotes the area of the signal line in one pixel, and a region having a dot denotes the area of the pixel electrode in one pixel.

Figure 9:
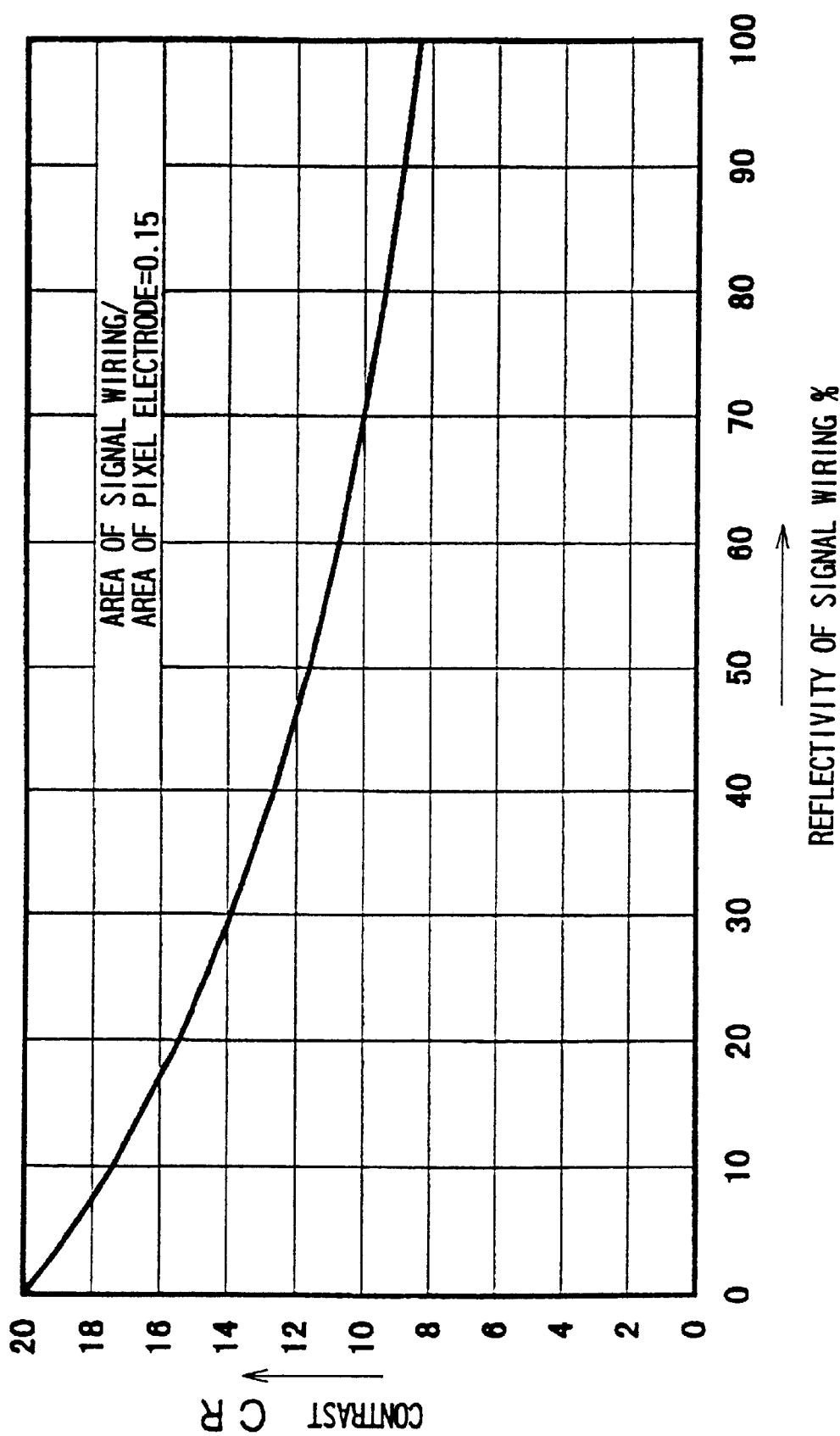
FIG. 9 is a chart showing a relationship between a reflectivity R of the signal line and a contrast CR.
Figure 10:
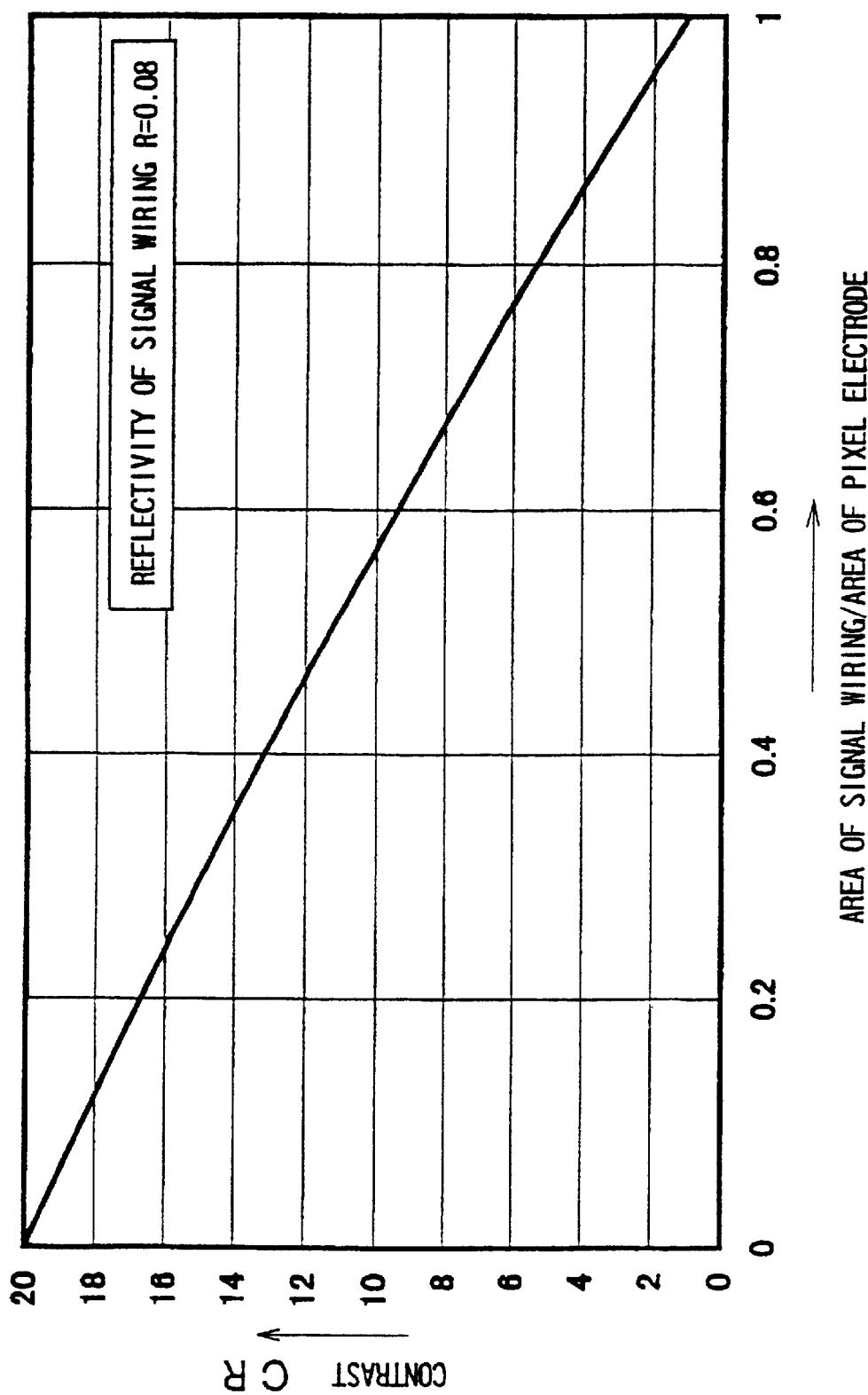
FIG. 10 is a chart showing a relationship between ratio (AS/AD) of an area of the signal line to an area of the pixel electrode and the contrast CR.

For example, in the case where the ratio (AS/AD) of the area of the signal line to the area of the pixel electrode is set to a constant value of 0.15 in a 3.9 type QVGA, the relationship between the reflectivity R of the signal line and the contrast CR is obtained as shown in FIG. 9. Moreover, in the case where the reflectivity R of the signal line is set to a constant value of 0.08, the relationship between the ratio (AS/AD) of the area of the signal line to the area of the pixel electrode and the contrast CR is obtained as shown in FIG. 10. As is apparent from FIGS. 9 and 10, the contrast CR of the LCD device is more enhanced as the reflectivity R of the signal line is more reduced, and the contrast CR of the LCD device is more enhanced as the ratio (AS/AD) of the area of the signal line to the area of the pixel electrode is more reduced.

On the other hand, it has been found from an experiment that visibility is not affected with a contrast CR of 15 or more in the reflection type liquid crystal display device.

Figure 11:
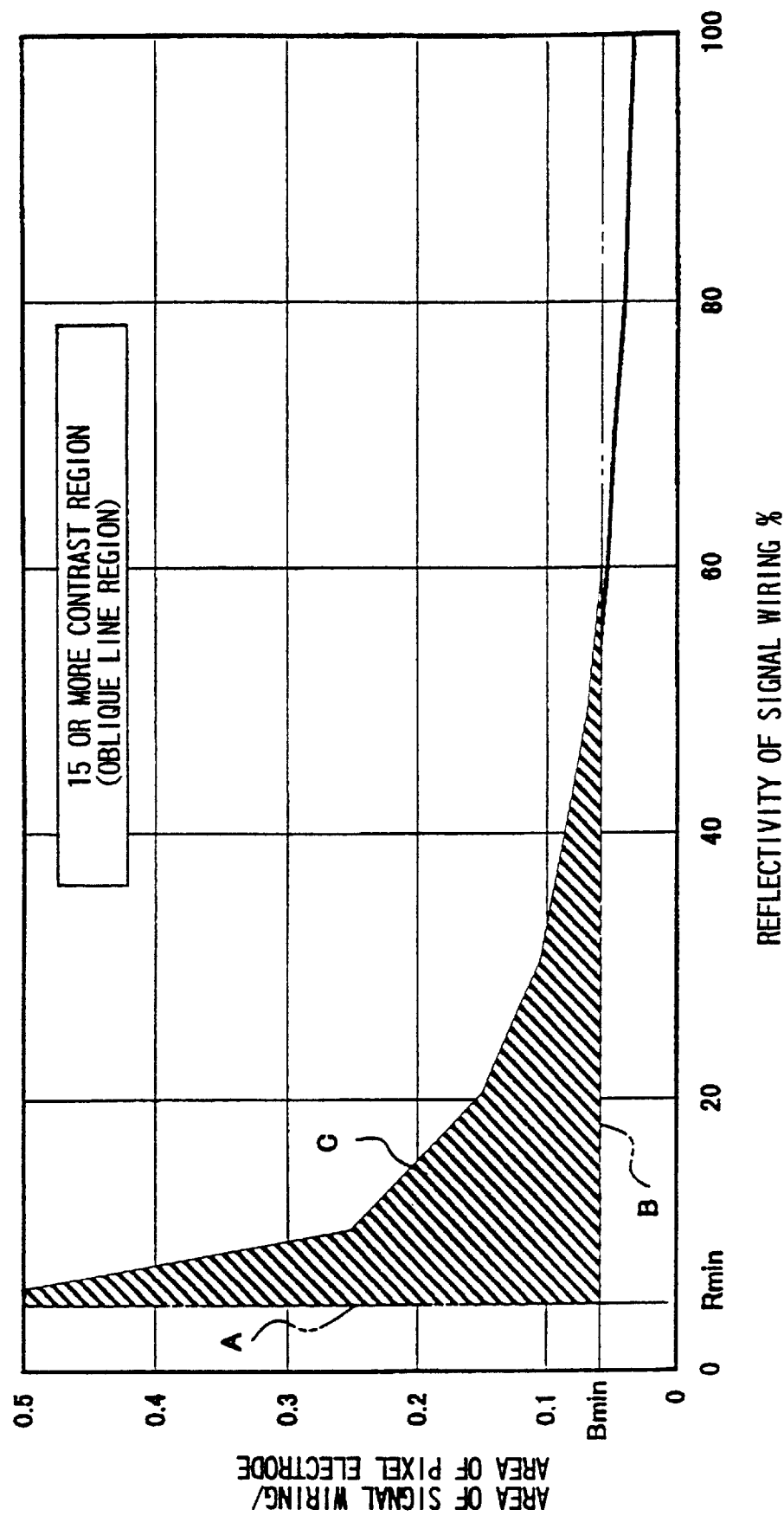
FIG. 11 is a chart showing a region having a contrast CR of 15 or more.

FIG. 11 is a graph collectively showing the above-mentioned results. In order to implement the reflection type liquid crystal display device, it is necessary to set the contrast CR to 15 or more. In order to meet the requirement, it is sufficient that the ratio (AS/AD) of the area of the signal line to the area of the pixel electrode and the reflectivity R of the signal line should be determined within a region shown in an oblique line enclosed by a straight line A passing through a lower limit value Rmin of the reflectivity R of the signal line, a straight line B passing through a lower limit value Bmin of the ratio (AS/AD) of the area of the signal line to the area of the pixel electrode and a curve C in FIG. 11.

The curve C represents the following equation.

$$\text{Curve }C(AS/AD)\leq(YW-15YB)/(14YM\times R)$$

YW: brightness obtained in a white display state

YB: brightness obtained in an black display state

VW: voltage to be applied in a white display state

VB: voltage to be applied in an black display state

YM: brightness obtained with an applied voltage of (VW+VB)/2

The lower limit value Rmin of the reflectivity R of the signal line is determined by interface reflection on upper and lower layers which are in contact with the signal line.

Accordingly, the straight line A represents the following expressions (1), (2).

$$R \geq Rmin \quad (1)$$

$$Rmin\left(\left(\frac{n1-n2}{n1+n2}\right)^2 + \left(1-\left(\frac{n1-n2}{n1+n2}\right)^2\right) \times \left(\frac{n2-n3}{n2+n3}\right)^2\right) \times 100 \quad (2)$$

n1: refractive index of an upper layer portion which is in contact with the signal line n2: refractive index of the signal line n3: refractive index of a lower layer portion which is in contact with the signal lines In FIG. 2, for example, n1 corresponds to the refractive index of the interlayer insulating film 12 and n3 corresponds to the refractive index of the gate insulating film 4.

Figure 12:
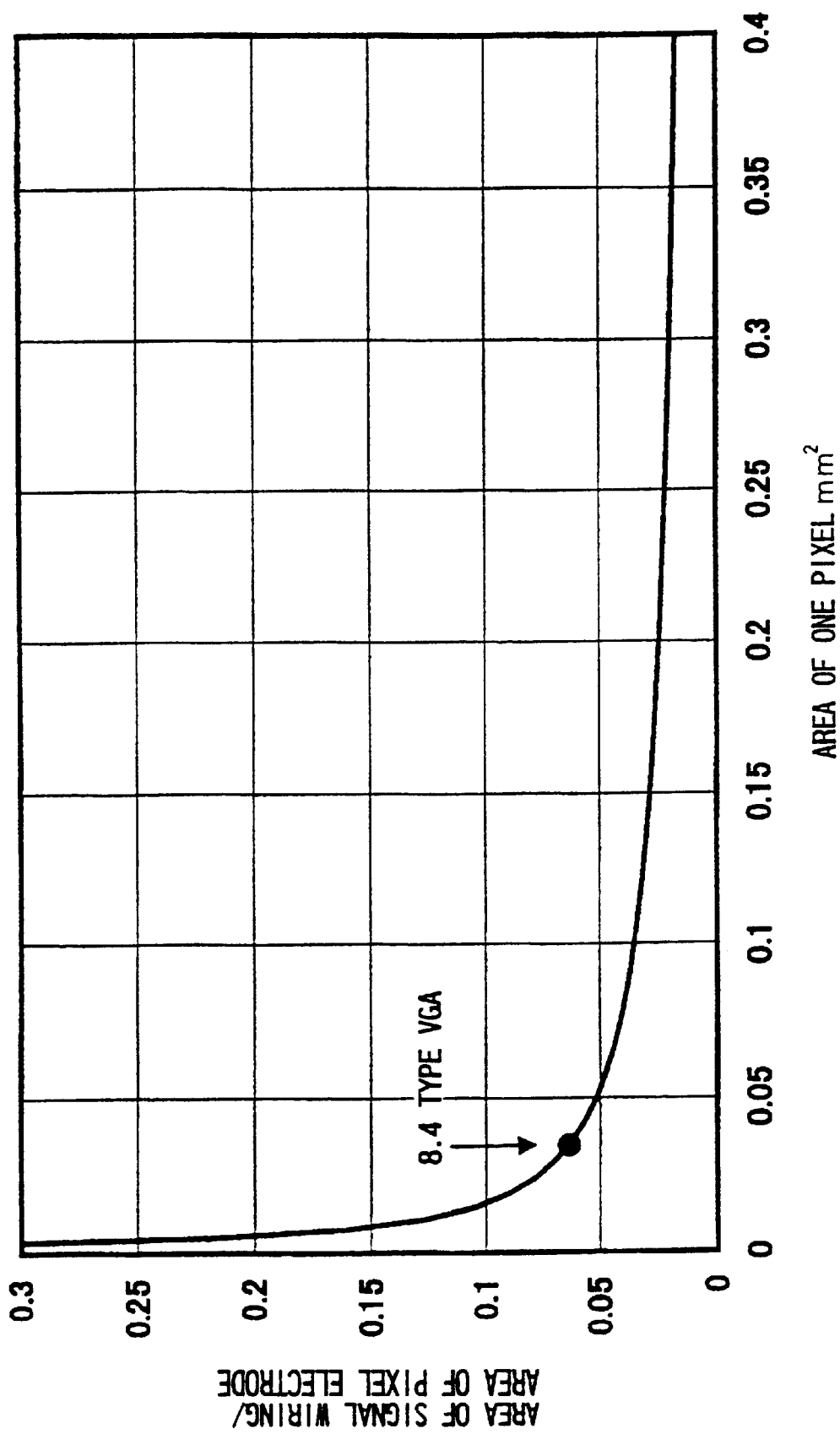
FIG. 12 is a chart showing a relationship between the ratio (AS/AD) of an area of the signal line to an area of the pixel electrode and an area of one pixel.

The lower limit value Bmin of the ratio (AS/AD) of the area of the signal line to the area of the pixel electrode is determined by the pattern precision of a process and the area of one pixel. In order to improve the application efficiency of light, usually, the pixel electrode is provided as largely as possible. In FIG. 8, a sampling width i of the pixel electrode and the signal line is equal to the pattern precision of the process. Therefore, the lower limit value Bmin and the straight line B represent the following expression (4), (3).

$$(AS/AD) \geq Bmin \quad (3)$$

$$Bmin = \frac{(f \times h1)}{(f - h2 - 2i) \times (g - h1 - 2i)} \quad (4)$$

f: longitudinal length of one pixel
g: transverse length of one pixel
h1: signal line width
h2: scanning line width
i: sampling width As shown in FIG. 8, for example, the relationship between the ratio (AS/AD) of the area of the signal line to the area of the pixel electrode and the area of one pixel is obtained as shown in FIG. 12 on the condition that a pattern precision (i) which is a technology generally carried out is set to 2 $\mu$m and the line width of each of the signal line 10 and the scanning line. 2 is set to 6 $\mu$m. The ratio (AS/AD) of the area of the signal line to the area of the pixel electrode for one pixel is calculated based on the curve and a value thus obtained is a lower limit value. A black circle shown in FIG. 12 represents an example of an 8.4 type VGA liquid crystal display device.

In the region where the optimum range (the region shown in the oblique line) of FIG. 11 is satisfied as described above, display having a good contrast can be obtained even if the specification of the liquid crystal display device is varied. The optimum conditions of the LCD device described above can be applied to the LCD device according to the second embodiment and an LCD device according to a third embodiment which will be described below.

Figure 13:
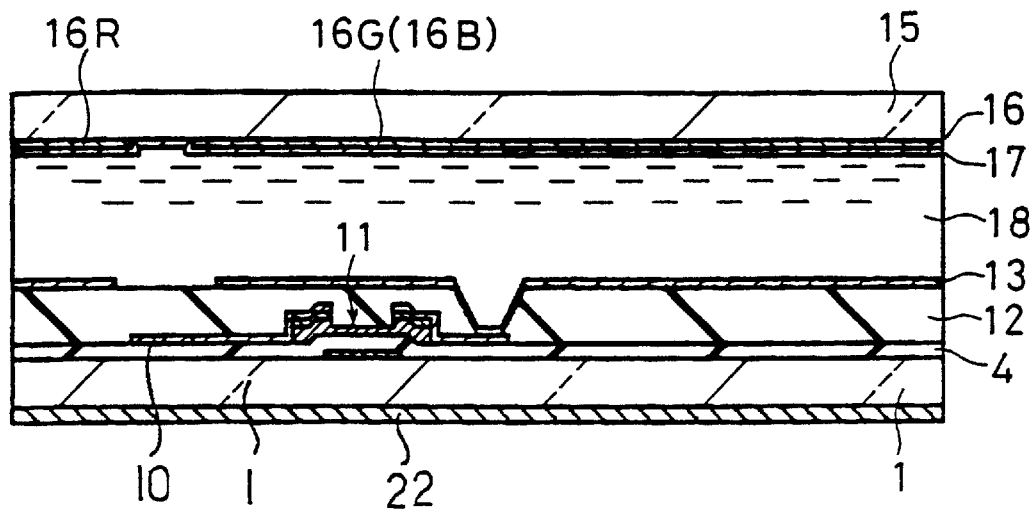
FIG. 13 is a partially enlarged sectional view showing a liquid crystal display device according to a third embodiment.

FIG. 13 is a sectional view showing a liquid crystal display device according to a third embodiment. A structure from a first substrate 1 to a second substrate 15 is the same as in the first or second embodiment. In the liquid crystal display device, a member having a high reflectivity is sometimes provided on the glass back face of the substrate in respect of the structure of a system. In this case, light transmitted through a signal line made of ITO or a scanning line made of ITO is reflected by the member having a high reflectivity and is returned again to the surface of the liquid crystal display device. Therefore, a contrast is deteriorated. In order to eliminate such a drawback, a material having a high light absorption is provided on the back face opposite to a liquid crystal layer of the first insulating substrate 1 made of glass or the like, thereby suppressing the reflected light. The arrangement of the material having a high light absorption corresponds to at least the signal line in the structure according to the first embodiment, and corresponds to at least the signal line and the scanning line in the structure according to the second embodiment.

As shown in FIG. 13, a low reflection film 22 to which a black pigment is added is stuck to the back face of the substrate 1. With the above-mentioned structure, light is absorbed into the low reflection film 22. Therefore, it is possible to prevent the reflection from being caused by the member having a high reflectivity.

Figure 14:
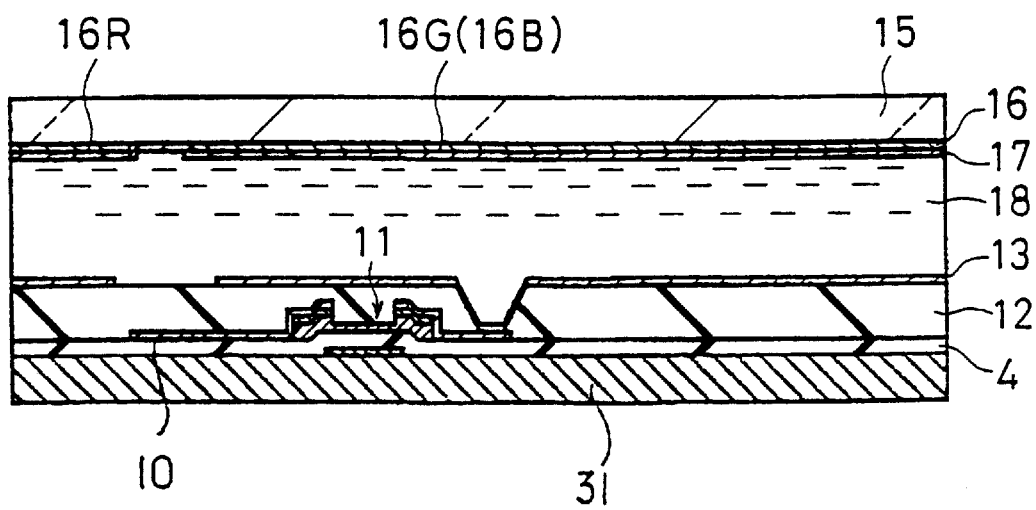
FIG. 14 is a partially enlarged sectional view showing a liquid crystal display device having another structure according to the third embodiment.
Figure 15:
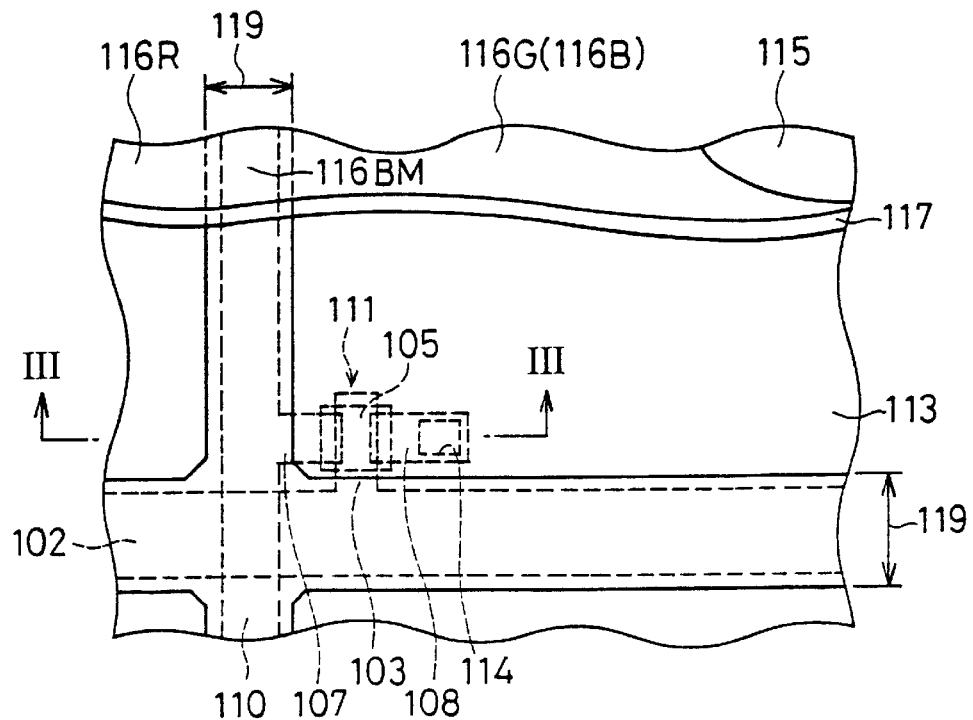
FIG. 15 is a partially enlarged plan view showing a reflection type liquid crystal display device according to the prior art.
Figure 16:
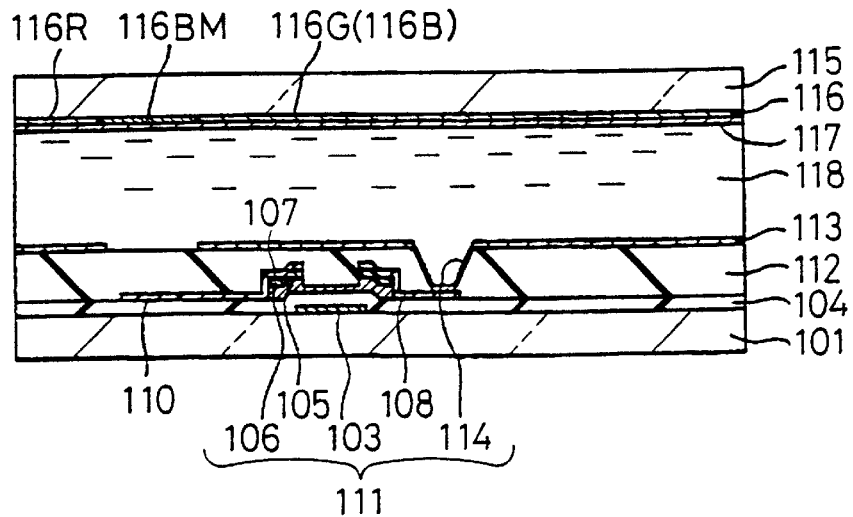
FIG. 16 is a partially enlarged sectional view showing the reflection type liquid crystal display device according to the prior art.
Figure 17A:
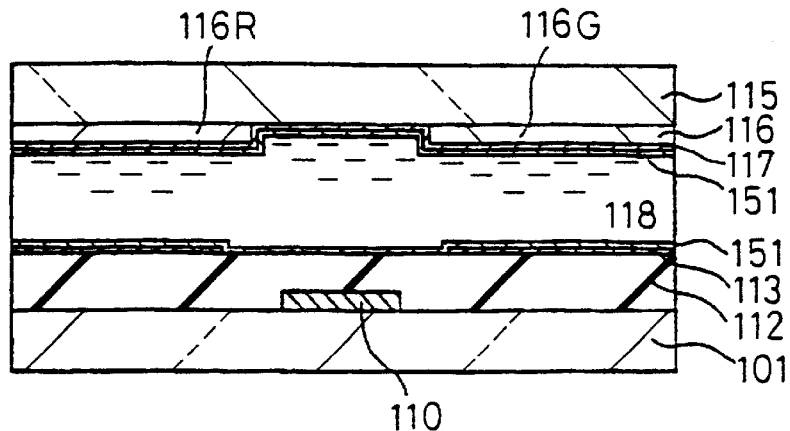
FIGS. 17A to 17C are views illustrating a color filter having a BM-less structure.
Figure 17B:
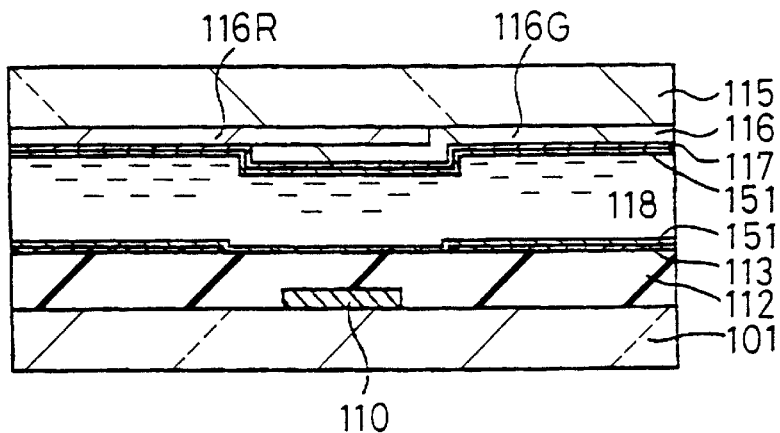
Figure 17C:
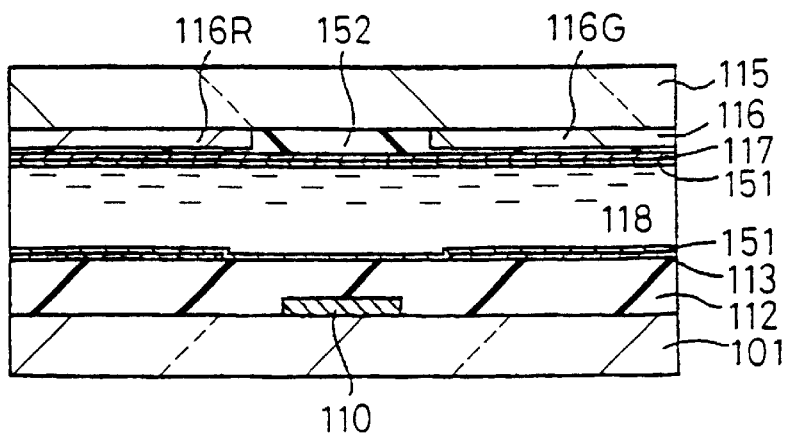

As shown in FIG. 14, moreover, in the case where a substrate 31 having a light absorption which is enhanced by adding a black pigment to a glass substrate is used in place of the first substrate, the same effects can be obtained even if an organic insulating film (BCB: Benzocyclobutene or the like) obtained by adding a pigment onto a glass substrate is formed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A reflective liquid crystal display device comprising:
   a liquid crystal layer;
   an active matrix substrate portion; and
   an opposite substrate portion,
   the active matrix and opposite substrate portions being provided opposite to each other with the liquid crystal layer interposed therebetween,
   the active matrix substrate portion including:
      a first insulating substrate;
      a plurality of scanning lines provided on the first insulating substrate;
      a plurality of transparent signal lines provided to cross corresponding scanning lines through an insulating film;
      a plurality of switching elements provided in operative communication with the signal lines and scanning lines; and
      a plurality of reflective pixel electrodes connected to the switching elements, respectively,
      the transparent signal lines being at least partially provided in a region between adjacent pixel electrodes on the first substrate, and
   the opposite substrate portion including:
      a second insulating substrate;
      at least one color filter provided on the second substrate; and
      a transparent conductive common electrode provided on the second substrate,
      wherein color layers of the color filter are formed in regions opposite to pixel electrodes, and a light transmitting portion is provided on the opposite substrate portion in a region opposite to and aligned with at least a part of the region between the pixel electrodes so that the same light passing through the light transmitting portion can also pass through the transparent signal lines, and wherein the signal lines are formed of a transparent conductive material.

2. The liquid crystal display device of claim 1, wherein the pixel electrode has a reflecting function.

3. The liquid crystal display device of claim 1, wherein a material having a high light absorption is disposed on the back face of the liquid crystal display device.

4. The liquid crystal display device of claim 1, wherein the light transmitting portion is provided in the region opposite to the signal line in the opposite substrate portion.

5. The liquid crystal display device of claim 4, wherein the orientation state of a liquid crystal molecule in the liquid crystal layer is set such that the liquid crystal display device becomes normally white.

6. The liquid crystal display device of claim 1, wherein the scanning lines are provided in regions between the pixel electrodes in the active matrix substrate portion, the light transmitting portion is provided in regions opposite to the signal line and the scanning line in the opposite substrate portion, and the scanning line is formed of the transparent conductive material.

7. The liquid crystal display device of claim 6, wherein the orientation state of the liquid crystal molecule in the liquid crystal is set such that the liquid crystal display device becomes normally black.

8. The device of claim 1, wherein the plurality of transparent signal lines are formed entirely of transparent material.

9. The device of claim 1, wherein the light transmitting portion is located at least partially between adjacent color filters.

10. The display of claim 1, wherein a number of components of light which can be transmitted through said light transmitting portion is larger than that of light which can be transmitted through the color filter.

11. A liquid crystal display device comprising:

first and second insulating substrates;

a liquid crystal layer between the first and second substrates;

a plurality of reflective pixel electrodes provided on the first substrate;

a plurality of address lines provided at least partially between adjacent pixel electrodes;

a common electrode provided on the second substrate and opposed to two or more pixel electrodes;

at least one color filter provided on the second substrate, wherein the at least one color filter includes color layers provided in regions opposite to the pixel electrodes, and a light transmitting portion is provided on the second substrate in a region opposite to and aligned with at least a part of the region between adjacent pixel electrodes so that the same light passing trough the light transmitting portion can also pass through the transparent address lines, and wherein at least one of the address lines is transparent and is formed of a transparent conductive material.

12. The device of claim 11, wherein said light transmitting portion is located at least partially between adjacent color filters, and light components which can be transmitted through said light transmitting portion are larger than light components that can be transmitted through said color filters.

13. The display of claim 11, wherein more components of light can be transmitted through the light transmitting portion than components of light which can be transmitted through the color layers.

14. A reflective liquid crystal display comprising:

first and second substrates;

a liquid crystal layer provided between the first and second substrates;

a plurality of reflective pixel electrodes on said first substrate which are in communication with corresponding switching elements;

a plurality of transparent address lines on said first substrate, each of said transparent address lines being at least partially located between a pair of pixel electrodes as viewed from above;

a plurality of color filters on the second substrate; and a transparent region located at least partially between adjacent color filters so that the same light passing through the transparent address lines can also pass through the transparent region.

15. The display of claim 14, wherein said color filters on the second substrate are spaced apart from one another so that there is a gap between each set of adjacent color filters.

16. The display of claim 14, wherein said transparent address lines comprise both transparent signal lines and transparent scan lines.

17. The display of claim 14, wherein a number of components of light which can be transmitted through the transparent region is larger than that of light which can be transmitted through said color filters provided on the second substrate.

18. A reflective liquid crystal display device comprising:

a liquid crystal layer;

an active matrix substrate portion; and an opposite substrate portion, the active matrix and opposite substrate portions being provided opposite to each other with the liquid crystal layer interposed therebetween, the active matrix substrate portion including:

a first insulating substrate;

a plurality of scanning lines provided on the first insulating substrate;

a plurality of transparent signal lines provided to cross corresponding scanning lines through an insulating film;

a plurality of switching elements provided in operative communication with the signal lines and scanning lines; and a plurality of reflective pixel electrodes connected to the switching elements, respectively, the signal lines being at least partially provided in a region between adjacent pixel electrodes on the first substrate, and the opposite substrate portion including:

a second insulating substrate;

a plurality of spaced apart color filters provided on the second substrate; and a transparent conductive common electrode provided on the second substrate, wherein color layers of the plurality of spaced apart color filters are formed in regions opposite to pixel electrodes, and a light transmitting portion is provided in a region in a gap between adjacent first and second spaced apart color filters opposite to and aligned with at least a part of the region between the pixel electrodes so that the same light passing through the transparent signal lines on the active substrate can also pass through the light transmitting portion on the opposite substrate, and a number of components of light which can be transmitted through said light transmitting portion is larger than that of light which can be transmitted through the first and second color filters, and wherein the signal lines are formed of a transparent conductive material.

19. A reflective liquid crystal display device comprising:

a liquid crystal layer;

an active matrix substrate portion; and an opposite substrate portion, the active matrix and opposite substrate portions being provided opposite to each other with the liquid crystal layer interposed therebetween, the active matrix substrate portion including:
 a first insulating substrate;
 a plurality of scanning lines provided on the first insulating substrate;
 a plurality of transparent signal lines provided to cross corresponding scanning lines through an insulating film;
 a plurality of switching elements provided in operative communication with the signal lines and scanning lines; and
 a plurality of reflective pixel electrodes connected to the switching elements, respectively, the transparent signal lines being at least partially provided in a region between adjacent pixel electrodes on the first substrate, and the opposite substrate portion including:
 a second insulating substrate;
 at least one color filter provided on the second substrate; and
 a transparent conductive common electrode provided on the second substrate, wherein color layers of the color filter are formed in regions opposite to pixel electrodes, and a light transmitting portion is provided in a region opposite to at least a part of the region between the pixel electrodes so that light passing through the light transmitting portion can also pass through the transparent signal lines, wherein the signal lines are formed of a transparent conductive material, wherein a reflectivity R of the signal line and a ratio (AS/AD) of area AS of the signal line to area AD of the pixel electrode are selected so as to meet all of the following conditions:

$$R >= R\text{min} \quad (1)$$

$$R\text{min}\left(\left(\frac{n1-n2}{n1+n2}\right)^2 + \left(1-\left(\frac{n1-n2}{n1+n2}\right)^2\right) \times \left(\frac{n2-n3}{n2+n3}\right)^2\right) \times 100 \quad (2)$$

n1: refractive index of an upper layer portion which is in contact with the signal line n2: refractive index of the signal line n3: refractive index of a lower layer portion which is in contact with the signal lines $$(AS/AD) \geq B\text{min} \quad (3)$$

$$B\text{min} = \frac{(f \times h1)}{(f - h2 - 2i) \times (g - h1 - 2i)} \quad (4)$$

f: longitudinal length of one pixel g: traverse length of one pixel h1: signal line width h2: scanning line width i: sampling width $$(AS/AD) \leq (YW - 15YB)/(14YM \times R) \quad (5)$$

YW: brightness obtained in white display state

YB: brightness obtained in black display state

VW: voltage to be applied in white display state

VB: voltage to be applied in black display state

YM: brightness obtained with an applied voltage of (VW+VB)/2.

20. The device of claim 19, wherein the plurality of transparent signal lines are formed entirely of transparent material.

21. The device of claim 19, wherein the light transmitting portion is located at least partially between adjacent color filters.

22. The device of claim 19, wherein a number of components of light which can be transmitted through said light transmitting portion is larger than that of light which can be transmitted through the color filter.

23. The device of claim 19, wherein the pixel electrode has a reflecting function.

24. The device of claim 19, wherein a material having a high light absorption is disposed on the back face of the liquid crystal display device.

25. The device of claim 19, wherein the light transmitting portion is provided in the region opposite to the signal line in the opposite substrate portion.

26. The device of claim 19, wherein the orientation state of a liquid crystal molecule in the liquid crystal layer is set such that the liquid crystal display device becomes normally white.

27. The device of claim 19, wherein the scanning lines are provided in regions between the pixel electrodes in the active matrix substrate portion,
 the light transmitting portion is provided in regions opposite to the signal line and the scanning line in the opposite substrate portion, and
 the scanning line is formed of the transparent conductive material.

28. The device of claim 19, wherein the orientation state of a liquid crystal molecule in the liquid crystal layer is set such that the liquid crystal display device becomes normally black.

* * * * *